United States Patent [19]

Patton

[11] Patent Number: 5,105,958

[45] Date of Patent: Apr. 21, 1992

[54] GOLFER'S WATER BOTTLE

[76] Inventor: James E. Patton, 999 Silver Springs, #1212, Wichita, Kans. 67212

[21] Appl. No.: 686,985

[22] Filed: Apr. 18, 1991

[51] Int. Cl.⁵ .............. B65D 23/00; B65D 55/16; B65D 51/18; B60R 9/00
[52] U.S. Cl. .................. 215/100 R; 215/14; 215/229; 215/306; 220/254; 224/274; 224/148
[58] Field of Search ............... 215/100 R, 1 A, 1 C, 215/101, 229, 306, 317; 220/254, 256, 259, 375; 224/274, 32 R, 35, 148

[56] References Cited

U.S. PATENT DOCUMENTS

| | | | |
|---|---|---|---|
| 1,445,642 | 2/1923 | O'Neill | 224/148 |
| 1,605,195 | 11/1926 | Lewis | 224/148 |
| 1,868,135 | 7/1932 | Bronander | |
| 2,521,573 | 9/1950 | Filler et al. | 150/1.5 |
| 2,710,108 | 6/1955 | Zarra | 215/14 |
| 2,731,093 | 1/1956 | Gordon | 220/254 X |
| 2,754,866 | 7/1956 | Coltman, Jr. | 220/254 X |
| 3,144,230 | 8/1964 | Brooks | 224/148 X |
| 3,212,743 | 10/1965 | Culver | 248/313 |
| 3,313,508 | 4/1967 | Mancl | 224/274 X |
| 3,533,526 | 10/1970 | Adell | 215/56 |
| 3,578,199 | 5/1971 | Duncan | 224/148 X |
| 3,844,459 | 10/1974 | Chambers | 224/29 B |
| 3,881,677 | 5/1975 | Ihlenfeld | 248/311 |
| 4,036,463 | 7/1977 | Hopkins et al. | 248/210 |
| 4,082,209 | 4/1978 | Sanders | 224/274 |
| 4,088,250 | 5/1978 | Schaefer | 224/5 W |
| 4,095,812 | 6/1978 | Rowe | 224/148 X |
| 4,325,503 | 4/1982 | Swinney | 224/148 |
| 4,345,704 | 8/1982 | Boughton | 224/39 |
| 4,366,922 | 1/1983 | Levine et al. | 224/32 R |
| 4,383,563 | 5/1983 | Kirchhoff, Jr. | 150/1.5 R |
| 4,459,827 | 7/1984 | Rhodes | 62/457 |
| 4,867,358 | 9/1989 | Bennis | 224/148 |
| 4,875,579 | 10/1989 | Tak | 206/315.1 |
| 4,883,205 | 11/1989 | Saelens et al. | 224/32 R |
| 4,976,364 | 12/1990 | Solomon | 215/229 |
| 4,979,707 | 12/1990 | McErlean | 224/148 X |
| 4,993,611 | 2/1991 | Longo | 224/148 |

FOREIGN PATENT DOCUMENTS

| | | | |
|---|---|---|---|
| 7535758 | 6/1977 | France | 224/32 R |
| 581507 | 9/1958 | Italy | 215/306 |
| 276582 | 10/1951 | Switzerland | 215/306 |

*Primary Examiner*—Stephen Marcus
*Assistant Examiner*—Vanessa Caretto
*Attorney, Agent, or Firm*—Kimmel, Crowell & Weaver

[57] ABSTRACT

A water bottle and support assembly for a golf bag includes a retainer bracket, a hanger strap and retaining belt for mounting the retainer bracket on the golf bag, and a water bottle supported by the bracket. The retainer bracket has a front surface provided with a vertically extending dovetail groove, and the water bottle has a corresponding dovetail tongue thereon sized to fit within the groove, so that the bottle can be easily and quickly installed or removed.

6 Claims, 3 Drawing Sheets

0
GOLFER'S WATER BOTTLE

BACKGROUND OF THE INVENTION

This invention relates to beverage containers, and to sporting apparatus. Specifically, the invention is directed to a removable water bottle for a golf bag.

Prior inventors have proposed various water bottle constructions, and mounting arrangement, for cyclists and other sportsmen. Golfers have been among those for whom special beverage containers have been designed. U.S. Pat. No. 4,459,827, for example, shows a cooler that is attached to a bracket supported on a golf bag by a strap. The cooler can be readily removed from the bracket. U.S. Pat. No. 3,844,459 discloses a beverage container mounted on a bracket that is secured to the handle of a golf cart.

A need remains for a beverage container which can be quickly and easily removed from a golf bag for refilling, or during transport, and yet is securely retained, so that it will not be dislodged when the bag is dropped or jostled as the bag is carted over rough terrain. As an accessory, the container and its mounting structure should be simple and economical to manufacture, and easy to install on any golf bag, despite variations in age sizes and designs.

SUMMARY OF THE INVENTION

In view of the foregoing, it is an object of the invention to provide a water bottle accessory for a golf bag, wherein the bottle can be easily and quickly removed for refilling, and reinstalled.

Another object is to produce a water bottle and holder that can be economically manufactured, and easily installed on a bag.

There and other objects of the invention are met by a water bottle and support assembly for a golf bag that includes a retainer bracket, a hanger strap and retaining belt for mounting the retainer bracket on the golf bag, and a water bottle supported by the bracket. The retainer bracket has a front surface provided with a vertically extending dovetail groove, and the water bottle has a corresponding dovetail tongue thereon sized to fit within the groove, so that the bottle can be easily and quickly installed or removed.

BRIEF DESCRIPTION OF THE DRAWINGS

In the accompanying drawings.

DESCRIPTION OF THE PREFERRED EMBODIMENT

Figure 1:
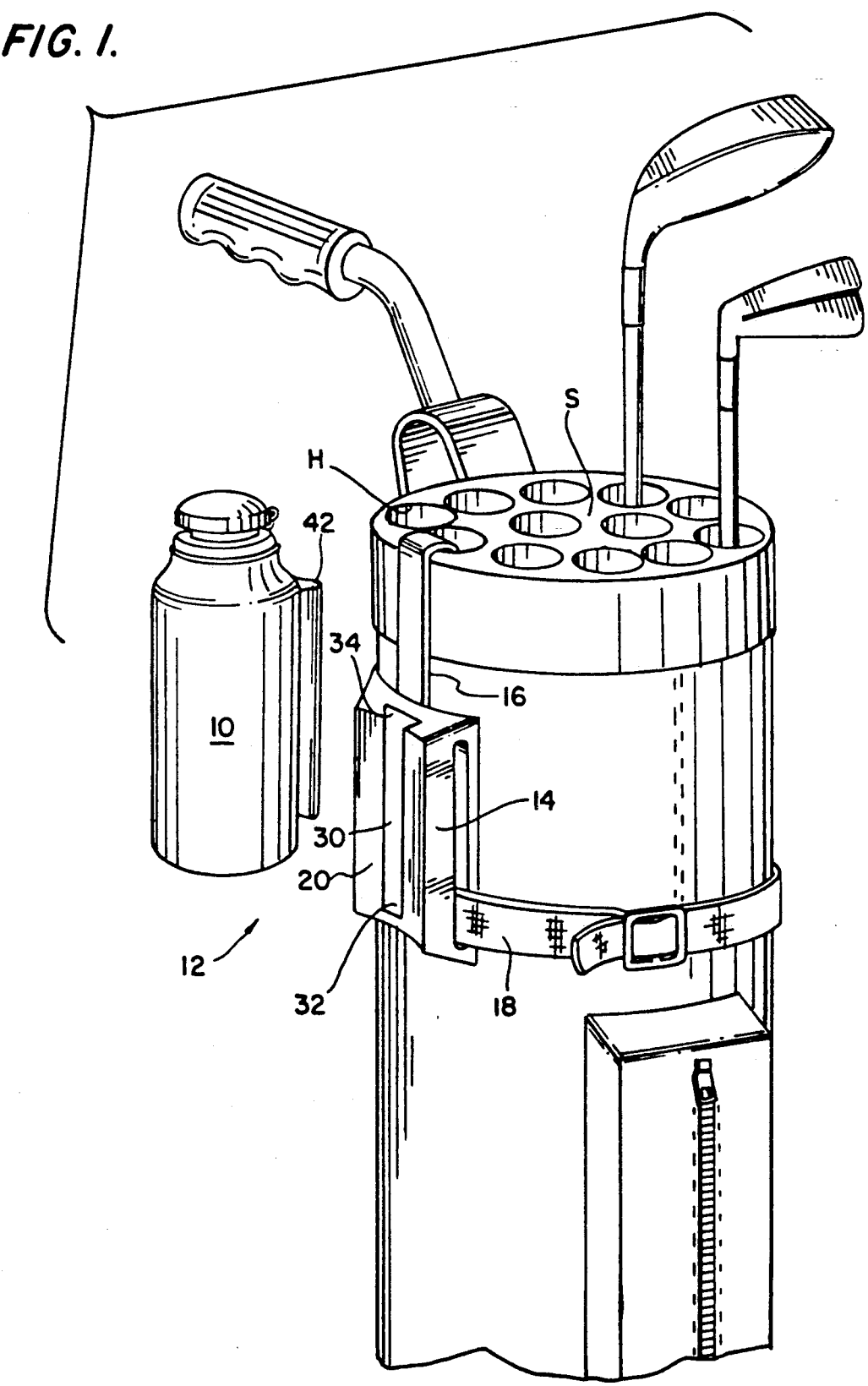
FIG. 1 is a perspective view of a golf bag, and of the front of a golf bottle support embodying the invention attached thereto, the bottle being removed from its slot to show the underlying structure.

FIG. 1 shows a typical golf bag, not itself part of the present invention. A standard club separator S, having plural holes H for receiving the acts of respective clubs, is positioned in the top end of the bag cavity,.

Figure 2:
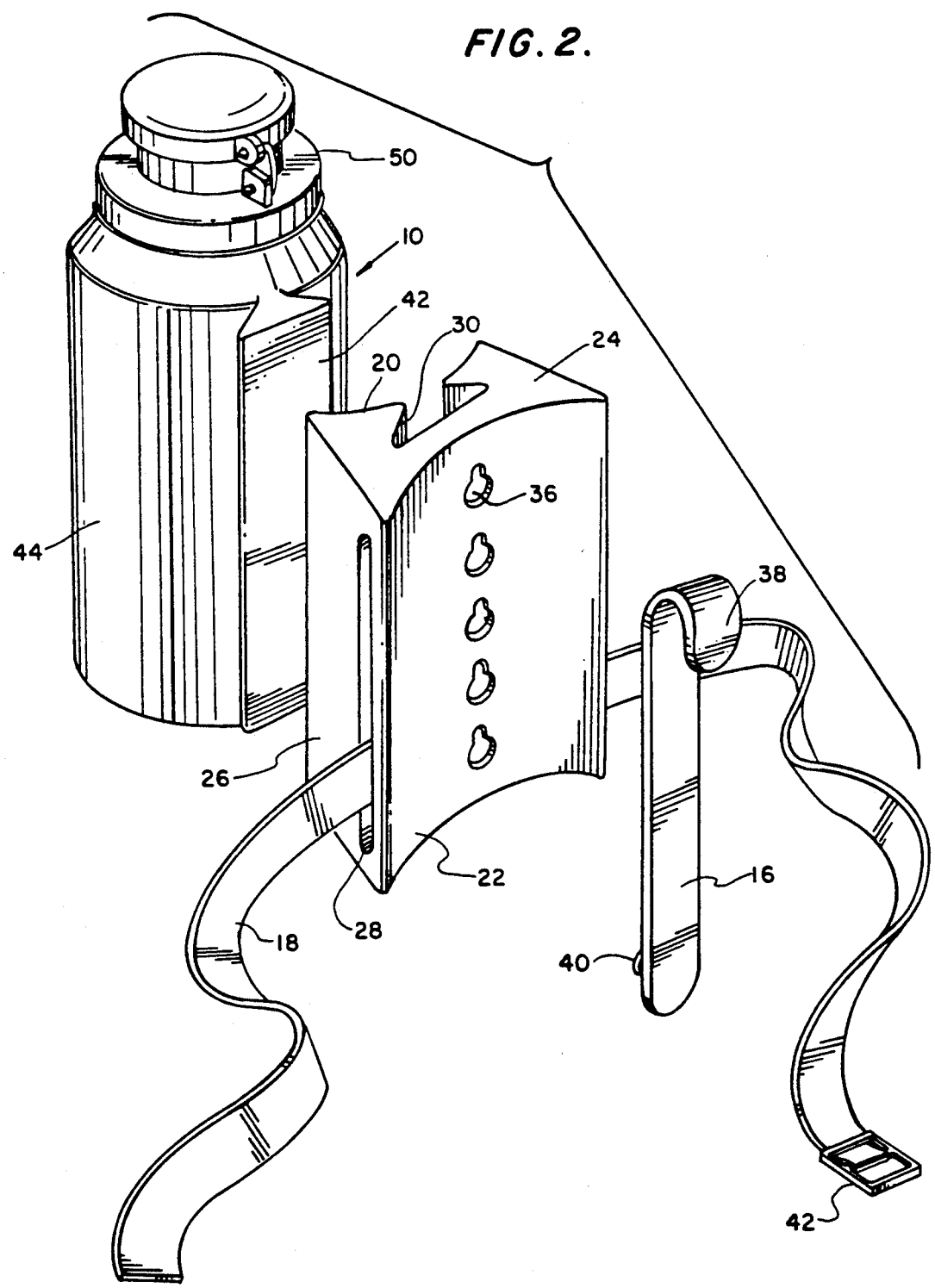
FIG. 2 is an exploded perspective view of the support and bottle, as seen from eh rear.

A water bottle 10 is shown exploded away from its support assembly, which is designated generally by numeral 12. The support assembly comprises a molded plastic bracket 14, a hanger strap 16, and a retaining belt 18, as shown. FIG. 2 shows the components of the support assembly in greater detail.

The bracket 14 has a concave front surface 20 which is shaped to conform to the outside of the water bottle, and a concave rear surface 22 shaped to conform to the surface of the gab. Extending between the surfaces 20 and 22 are a top surface 24, a bottom surface (not shown), a right side surface 26, and a left side surface, not shown, which is a mirror image of the right side surface.

A through slot 28 extends lately through he bracket, opening onto the left and right side surfaces. The height of the slot is substantially greater than the width of the retaining belt, so that the bracket can be adjusted up and down.

The front surface 20 (FIG. 1) of the bracket is interrupted by a vertically extending dovetail groove 30 which has a closed bottom 32, but is open at its upper end 34.

The rear surface 22 (seen in FIG. 2) of the bracket is unbroken, except for five keyholes 36 aligned along the vertical center plane of the bracket. Each keyhole opens into the transverse slot 28—the wall thickness of the bracket at this point being only about an eighth of an inch.

The hanger strap 16 is made of a strip of stainless steel, or a coated metal. Both ends are rounded, and the upper end is bent over 180° to form a hook 38. A stud 40 is affixed to the lower end, as by welding, on the side of the strap opposite the hook. The stud has a head sized to fit through the larger portion of the keyhole, and a shank corresponding in size to that of the smaller portion of the keyhole.

The belt 18, as shown in FIG. 2, is formed from a length of nylon fabric webbing, and has a plastic molded buckle 42 attached tat one end.

Figure 3:
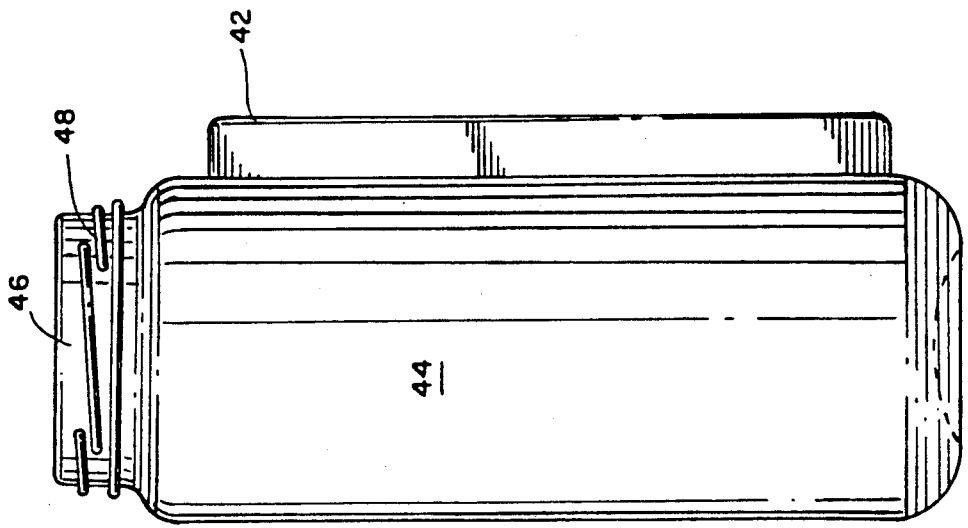
FIG. 3 is a side elevation of the bottle alone, with its cap removed.
Figure 4:
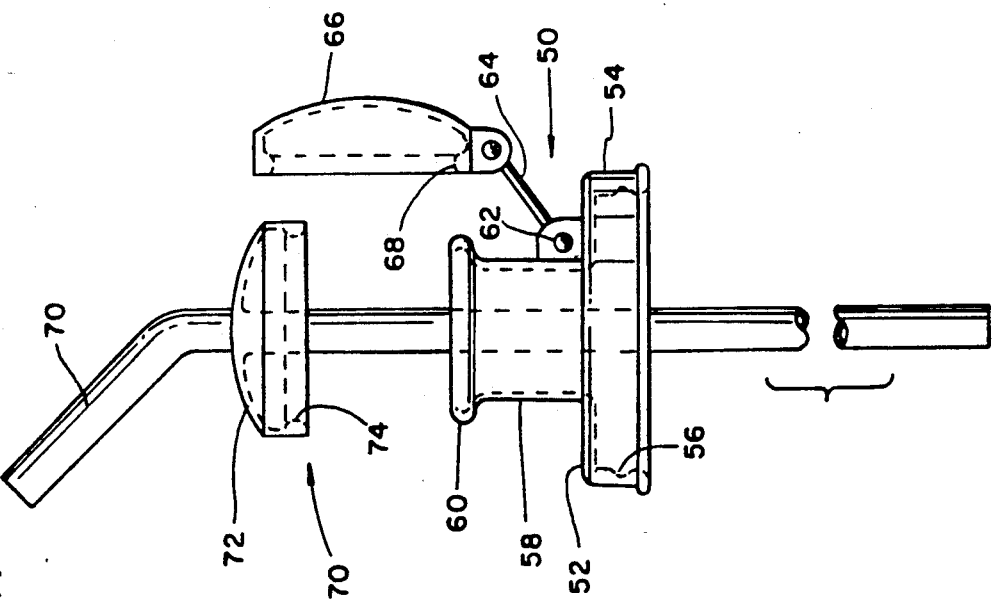
FIG. 4 is a side elevation of the bottle cap, with its cover open and a drinking straw begin inserted.

The water bottle 10 itself includes a generally cylindrical container 44 having a dovetail tongue 42 molded vertically along a generator of the cylinder. The tongue is substantially the same size as the groove 30 in the bracket, or slightly smaller, to provide some clearance. As shown in FIG. 3, the mouth 46 of the container has a plural-flute helical thread 48, onto which the cap assembly 50 shown in FIGS. 1 and 4 is screwed.

The cap assembly 50 includes a main body 52 having a downturned peripheral flange 54 with internal threads 56 therein, and a neck 58 extending upward away from the flange, and terminating at a circumferential lip 60. A tether tab 62 is formed at the base of the neck; the hole int eh tab receives one end of a tether 64 whose other end is connected to a snap-on cover 66. The tether is preferably a .09 inch diameter strap having enlarged conical barons at either end, the barbs being sized to enter, but not withdraw from, the hole in the tab, and in a corresponding tab on the cover. See FIG. 1.

The cover 66 (FIG. 4) defines a shallow cavity bounded by an inwardly extending peripheral flange 68 of slightly lesser diameter than that of the lip 60, but greater than that of the neck 58, so that the cover can be snapped onto the neck to seal the container. An interference fit of .06 inch between the lip and flange diameters is suitable to perform this function.

When the cover is open, a drinking straw 70 may e inserted into the container through the neck. The straw is preferably integrally formed with a skirt, similar in shape to the cover, which likewise has an internal flange 74 that permits the skirt to be snapped in place over the lip. The outer diameter of the skirt is less than the inner diameter of the mouth, so that the straw can be stored inside the container.

To install the bottle on the golf bag, the stud of the hanger strap si first inserted into one of the keyholes on the back of the bracket. The hook of the hanger strap is then placed over the rim of the bag, to support the bracket, and one end of the remaining belt is then inserted through the slot in the bracket. The ends of the belt are drawn around the back, and buckled together, to secure the bracket. Now the bottle (previously filled with water) is dropped into the retainer groove, which thereafter prevents movement of the bottle in any direction, except upward for removal. The drinking straw, or alternatively, the cover, is snapped in place over the neck to protect the contents during play, and thereafter during transport.

Except of the belt buckle and the hanger strap, all the components of this invention, including the bottle, are preferably made of molded plastic, such as high density polyethylene. Other materials may be substituted, however, without departing from the invention. Inasmuch as the invention is subject to these and other modifications and variations, it is intended that the foregoing description and the accompanying drawings shall e interpreted as illustrative of only one form of the invention, whose scope is to e measured by the following claims.

I claim:

1. A water bottle and support assembly for a golf bag, comprising a retainer bracket, means for mounting the retainer bracket on the golf bag, the retainer bracket having a front surface facing away from the golf bag, and having a vertically extending dovetail groove formed in the front surface, the groove having a closed bottom and an open top, and a water bottle having a dovetail tongue thereon sized to fit within said dovetail groove, whereby the tongue may be vertically inserted into the groove, to support the bottle, said bracket mounting means comprising a hanger strap for suspending the bracket from an upper end of the bag, and a retaining belt which may be passed around the bag, the bracket having a transverse through slot through which the belt may be passed, and said bracket having, facing the bag, a rear surface provided with at least one keyhole extending between the rear surface and the transverse slot, and the hanger strap has a stud thereon sized to fit into the keyhole, and be retained thereby.

2. The invention of claim 1, wherein the transverse slot has a height greater tan that f said belt, and the rear surface of the bracket is provided with a plurality of keyhole slots, to permit vertical adjustment of the bracket on the bag.

3. A water bottle and support assembly for a golf bag, comprising a retainer bracket, means for mounting the retainer bracket on the golf bag, the retainer bracket having a front surface facing away from the golf bag, and having a vertically extending dovetail groove formed in the front surface, the groove having a closed bottom and an open top, and a water bottle having a dovetail tongue thereon sized to fit within said dovetail groove, whereby the tongue may be vertically inserted into the groove, to support the bottle, wherein the bottle comprises a container having an externally threaded mouth and a cap having a downturned flange internally threaded for mounting over the mouth, the cap including an upwardly extending neck with a circumferential lip thereon, and a closure which snaps over the lip.

4. The invention of claim 3, wherein said closure is a cover having an internal flange of diameter less than that of the lip, whereby the cover can be snapped over the lip to seal the container.

5. The invention so claim 4, further comprising a tether extending between the cap nd the cover.

6. The invention of claim 3, wherein said closure comprises a drinking straw having an integral skirt, the skirt having an internal flange of diameter less than that of the lip, whereby the skirt can e snapped over the lip to seal the container.

* * * * *